A. SIMONS.
SCALE HOLDER.
APPLICATION FILED FEB. 27, 1919.
1,346,513.
Patented July 13, 1920.
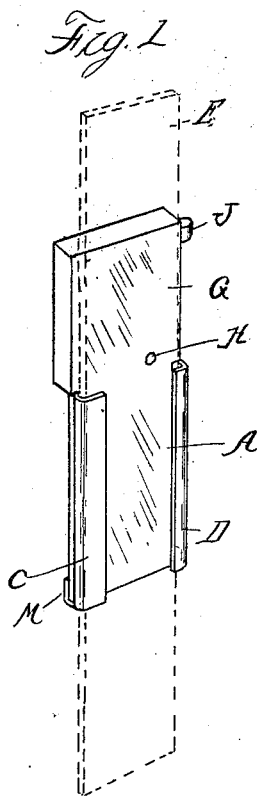
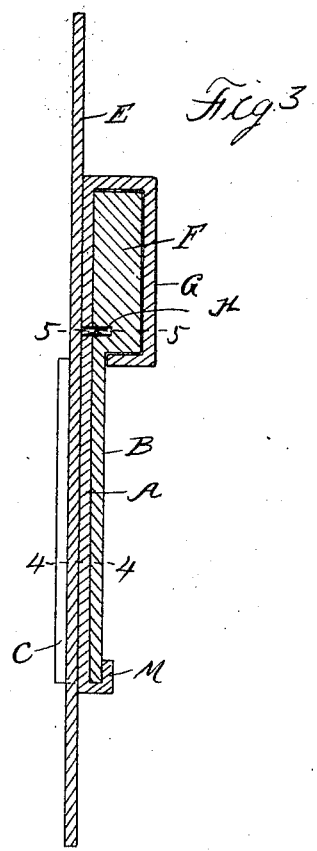
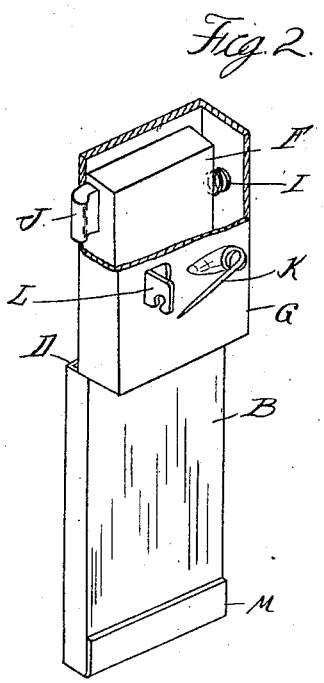
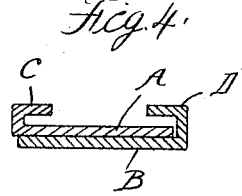
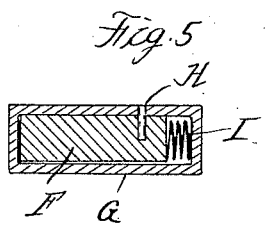
Inventor
Alex Simons
By Whittemore Hulbert & Whittemore
Attorneys

UNITED STATES PATENT OFFICE.

ALEX SIMONS, OF DETROIT, MICHIGAN.

SCALE-HOLDER.

1,346,513.    Specification of Letters Patent.    Patented July 13, 1920.

Application filed February 27, 1919. Serial No. 279,632.

*To all whom it may concern:*

Be it known that I, ALEX SIMONS, formerly a subject of the King of Serbia, having taken out first citizenship papers of the United States of America, residing at Detroit, in the county of Wayne and State of Michigan, have invented certain new and useful Improvements in Scale-Holders, of which the following is a specification, reference being had therein to the accompanying drawings.

This invention relates to scale holders and has particular reference to a holder for the vest-pocket steel scales such as are carried by almost every mechanic.

The work of the machinist is of such a nature as to require stooping over quite frequently and at such times there is a tendency for the steel scale to slip from the workman's pocket, unless quite securely placed therein. This not only occasions some annoyance to the workman, but eventually results in the loss of his scale through failure to notice its fall.

It is the object of the invention to eliminate both the inconvenience and loss, aforementioned, by providing an inexpensive holder attachable wherever desired to the garments of the workman and having provision for securely clamping the scale and for quickly releasing the same when desired.

Such a construction is illustrated in the accompanying drawings, wherein—

Figure 1 is a perspective rear view of the scale holder, the scale being indicated in dash lines;

Fig. 2 is a perspective front view, the upper portion of the holder being broken away to show interior features;

Fig. 3 is a vertical sectional view;

Fig. 4 is a transverse section on line 4—4 of Fig. 3;

Fig. 5 is a transverse section on line 5—5 of Fig. 3.

In these views, the reference characters A and B respectively designate two superposed sheet metal plates which are formed upon corresponding end portions with flanges C and D at their opposed edges, said flanges being bent toward each other and constituting a pair of coacting jaws for engaging the steel scale E. Upon their other end portions the plate B rigidly carries the metallic rectangular block F, and the plate A is shaped to form the casing G loosely inclosing the block F. A pin H carried by the plate A enters the block F adjacent the jaw-carrying portion of the plate and establishes a pivotal connection between the plates. In a clearance space provided between the block F and one side of the casing G, there is mounted the coil spring I bearing at its ends respectively upon the block and casing and urging the jaws C and D toward each other. Contact of the block with the other side walls of said casing limits the relative movement of the plates A and B, effected by said spring I. The spaced relation of the jaws C and D is such that when the scale E is engaged between said jaws, the latter will securely clamp said scale by virtue of the spring I. The releasing means is in the nature of a lug J carried by the block F at the side thereof opposite to that engaged by the spring I, said lug projecting exteriorly of the casing so that the workman by pressing upon said lug may relatively shift the plates A and B in opposition to the spring I and thereby move the jaws C and D sufficiently apart to release the scale E.

The means for attaching the scale holder to the vest or other garment of the mechanic comprises the spring-pin K and the catch L, both mounted upon the rear face of the casing G, the catch L preferably having the nature of a lug struck up from the casing G.

Since the jaws C and D project at the front of the holder, while the block F and casing G are at the rear side thereof, said block and casing present no obstruction to engagement of any portion of the scale with the jaw. Preferably the plate A is provided at its lower end with the return-bent guide-flange M loosely embracing the lower end of the plate B.

What I claim as my invention is:

1. A scale holder comprising a pair of pivotally connected superposed plates, coacting jaws respectively carried by said plates at one side of their pivotal connection, a spring at the other side of said pivotal connection acting upon said plate to effect closing of said jaws, and means carried by said holder for attaching the same to a garment.

2. A scale holder comprising a pair of superposed plates respectively formed upon opposed lateral edges with a pair of coacting jaws for engaging a scale, spring means for closing said jaws upon the scale, a releasing lug projecting from one of said jaws, and means for attaching the holder to a garment.

3. A scale holder comprising a pair of superposed plates pivotally connected and formed at one side of their pivots with coacting jaws for engaging the scale, a casing carried by one of said plates at the other side of the pivot, the other plate being extended into said casing, a spring arranged within said casing for closing the jaws upon a scale, a releasing member projecting from the plate within said casing, and means for securing the holder to a garment.

4. A scale holder comprising a pair of superposed plates intermediately pivotally connected and formed at one side of their pivots with flanges at opposed edges, constituting coacting jaws for engaging a scale, a block carried by one of said plates at the other side of their pivots, a casing carried by the other plate and inclosing said block, a spring within said casing engaged between said block and a wall of the casing for closing said jaws upon a scale, the opposite wall of said casing limiting relative movement of the plates effected by said spring, a releasing member carried by said block and projecting through the casing, and means carried by the casing for securing the holder to a garment.

5. A scale holder comprising a pair of jaws spring pressed toward each other and proportioned to engage a mechanic's scale, and means for attaching the same to a garment.

6. A scale holder comprising a pair of sheet metal jaws arranged to clamp the opposite sides of a scale, means yieldably urging said jaws toward each other, and means for attaching the same to a garment.

7. A scale holder comprising a pair of superposed plates respectively formed upon opposed lateral edges with a pair of coöperating jaws for engaging a scale, spring means for closing the jaws upon the scale, and means for attaching said holder to a garment.

8. A scale holder comprising a pair of clamping jaws spring pressed toward each other, one of which jaws has a rectangular casing formed integral with its upper portion, and means carried by said casing for securing the device to a garment.

9. A scale holder comprising a pair of sheet metal jaws yieldably urged toward each other, a substantially rigid support from which said jaws depend, and means carried by said support for securing the device to a garment.

In testimony whereof I affix my signature.

ALEX SIMONS.